United States Patent [19]

Huber

[11] Patent Number: 4,823,462

[45] Date of Patent: Apr. 25, 1989

[54] MASS AIR FLOW SENSOR ASSEMBLY AND METHOD OF MANUFACTURE

[75] Inventor: Duane J. Huber, Bartlett, Ill.

[73] Assignee: Hilex Poly Company, Inc., Los Angeles, Calif.

[21] Appl. No.: 38,624

[22] Filed: Apr. 14, 1987

[51] Int. Cl.⁴ ................... G01M 19/00; H05K 13/00
[52] U.S. Cl. ........................................ 73/118.2; 29/856
[58] Field of Search ............... 73/118.1, 204, 118.2; 29/856, 855; 156/242, 244.12; 264/263, 272.18, 272.16, 272.14, 272.17, 272.1, 272.13, 157, 160, 328.1; 174/52 PE, 52 R

[56] References Cited

U.S. PATENT DOCUMENTS

| | | | |
|---|---|---|---|
| 1,871,492 | 8/1932 | Brennecke | 264/272.18 |
| 4,330,790 | 5/1982 | Burns | 29/856 |
| 4,433,576 | 2/1984 | Shih et al. | 73/204 |
| 4,445,369 | 5/1984 | Stoltman et al. | 73/204 |
| 4,538,168 | 8/1985 | Van Dyk Soerewyn | 174/52 PE |
| 4,635,475 | 1/1987 | Jones et al. | 73/118.2 |

FOREIGN PATENT DOCUMENTS

| | | | |
|---|---|---|---|
| 0091837 | 7/1980 | Japan | 264/272.16 |
| 0014025 | 1/1982 | Japan | 264/328.1 |

Primary Examiner—Michael J. Tokar
Assistant Examiner—Robert R. Raevis
Attorney, Agent, or Firm—Darby & Darby

[57] ABSTRACT

A sensor assembly for sensing the air-to-fuel mixture in an internal combustion engine, and a method of manufacturing it. The assembly comprises a premolded plastic panel which is adapted to receive a Kapton and a terminal strip stamping. The stamping is positioned over the Kapton on registry pins in the panel. Another panel is then injection molded over the stamping and Kapton, welding itself to the one panel. The stamping and Kapton are encapsulated without damage to the Kapton. Terminal strip bridges are then removed from the stamping and a resistor welded between two of the strips.

4 Claims, 3 Drawing Sheets

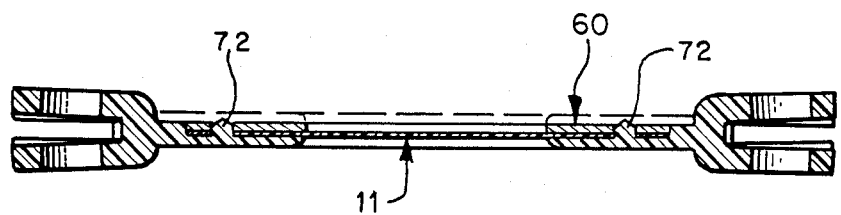
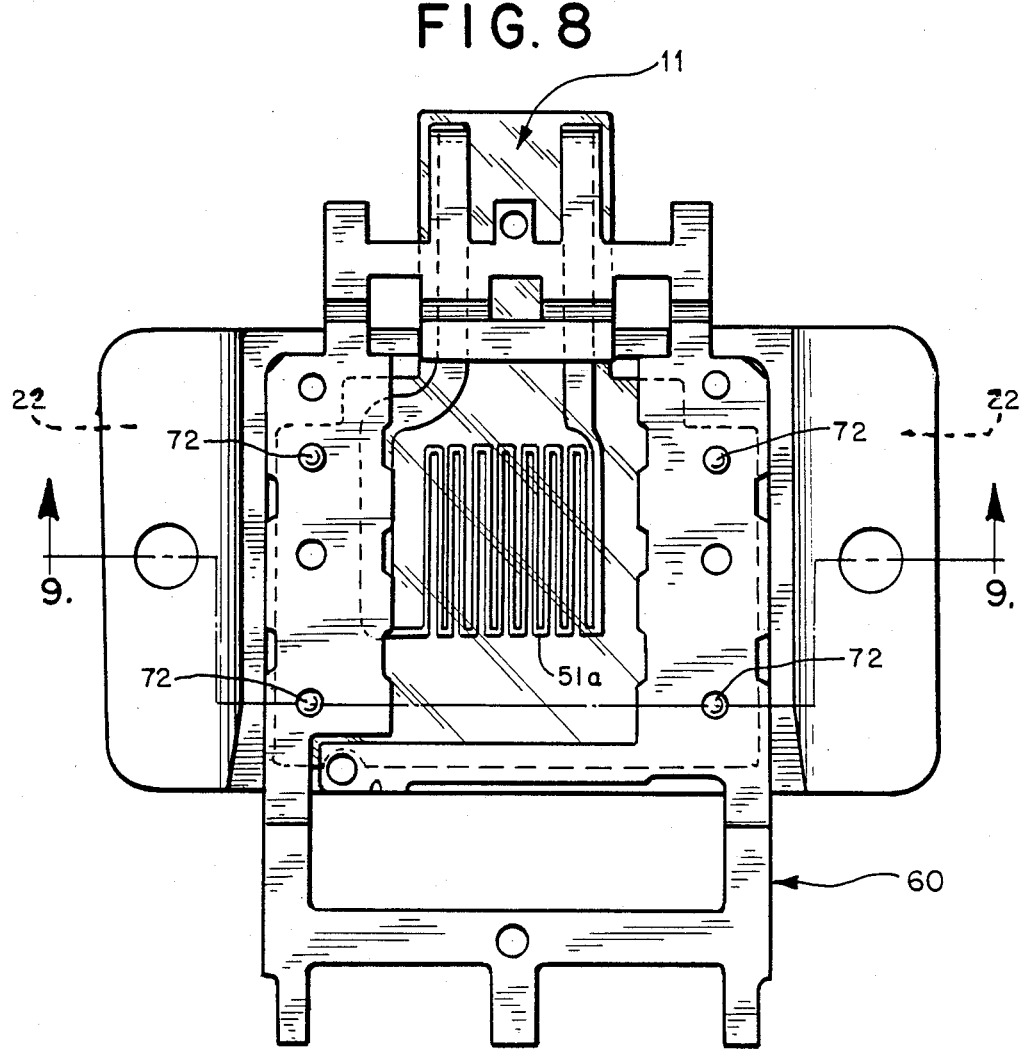

MASS AIR FLOW SENSOR ASSEMBLY AND METHOD OF MANUFACTURE

FIELD OF THE INVENTION

This invention relates generally to the control of air and fuel mixtures in internal combustion engines. It relates particularly to a mass air flow sensor assembly for controlling air-fuel mixtures and a method of manufacturing the sensor assembly.

BACKGROUND OF THE INVENTION

A mass air flow sensor assembly is designed to sense, and control, the air to fuel mixture ratio in a gasoline, internal combustion engine. The sensor assembly operates by measuring the temperature differential between air and gasoline molecules. By doing this it can determine what the mixture ratio of these molecules is, and cause signals to be sent back to a mixture control. A desirable mixture is then achieved by automatic adjustment of the mixture control.

The temperature differential between molecules is actually determined by a nickel foil serpentine sensing circuit. The sensing circuit is laminated between two thin sheets of plastic film. The film in this sensing circuit laminate may be purchased as a unit from companies like Sierra, of California, which identifies it as a "Kapton".

The assignee of the present invention, Capsonic Group, Inc., has manufactured mass air flow sensor assemblies for several years. Initially the process involved supporting a Kapton and a terminal strip stamping from one side in an injection mold die and partially encapsulating the two elements in a plastic dielectric from the other side. A second molding operation then encapsulated the Kapton and stamping further, from the other side, welding it to the first molded panel.

This sensor assembly construction was a marked improvement over assemblies which had previously been made. In conventional constructions at that time, two molded blocks of plastic were glued together by hand, with a Kapton in between. The circuitry was entirely separate. This was a labor-intensive process and, by the very nature of this process, had quality control problems.

The method developed by Capsonic Group, Inc. eliminated much of the hand labor but subjected the Kapton to substantial stress during the fabrication operation. As a result, the Kapton sometimes suffered indiscernible temperature and pressure damage, resulting in subsequent delamination of the Kapton during operation of the sensing assembly.

SUMMARY OF THE INVENTION

It is an object of the present invention to provide an improved method of fabricating a mass air flow sensor assembly. It is another object to provide a method which subjects the Kapton to less stress during the fabrication of the assembly and results in fewer defective assemblies. It is another object to provide a method which is simpler and less expensive then previously known methods for fabricating mass air flow sensor assemblies. A further object is to provide an improved mass air flow sensor assembly construction.

The foregoing and other objects are realized by providing, in accord with one aspect of the invention, a method of fabricating a mass air flow sensor assembly which embodies straight molding one side panel of the sensor body first. A terminal strip stamping and a Kapton are then seated in the one molded side panel, the stamping on top of the Kapton. Registry pins on the one side panel extend through registry holes in the Kapton and stamping to precisely position it. This sub-assembly is seated in an injection molding die and the stamping and Kapton are encapsulated by dielectric plastic material and, at the same time, bonded to the one side panel of the straight molded sensor body. Another side panel is, in effect, formed.

The encapsulated terminal strip stamping and Kapton, in the sensor body, are removed from the injection molding die and seated in a finish stamping machine. It is effective, in a conventional manner, to sever and remove four terminal strip bridges from the stamping, leaving three separate terminal strips encapsulated in the sensor body. A resistor is welded between two of these strips to complete the sensor assembly.

The sensor assembly thus comprises one premolded panel against which the Kapton is seated. Three terminal strips overlie the Kapton and are seated against the second panel. The second panel is welded to the one panel.

BRIEF DESCRIPTION OF THE DRAWINGS

The invention, including the method and assembly, are illustrated more or less diagrammatically in the drawings, in which:

FIG. 8 is a plan view, similar to FIG. 1, showing the mass air flow sensor assembly at an intermediate step in the fabrication method; and FIG. 9 is a side elevationl view of the assembly illustrated in FIG. 8.

DESCRIPTION OF THE PREFERRED EMBODIMENT

Figure 1:
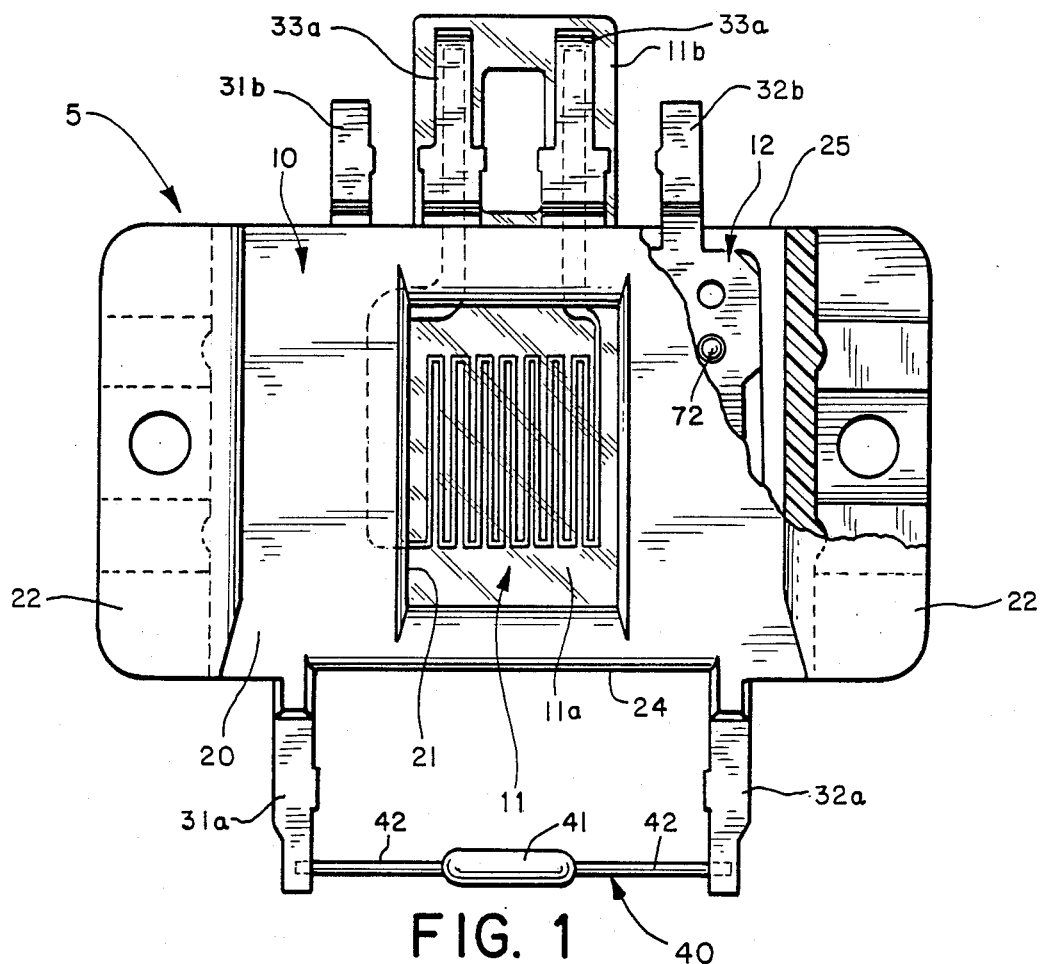
FIG. 1 is a top plan view of a mass air flow sensor assembly embodying features of the invention.
Figure 2:
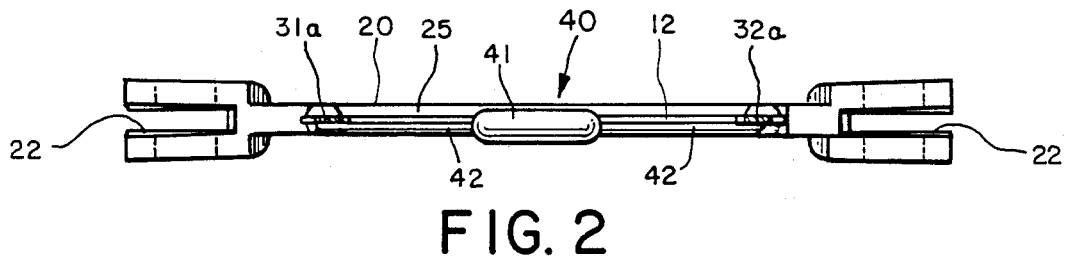
FIG. 2 is a side elevational view of the assembly illustrated in FIG. 1.
Figure 3:
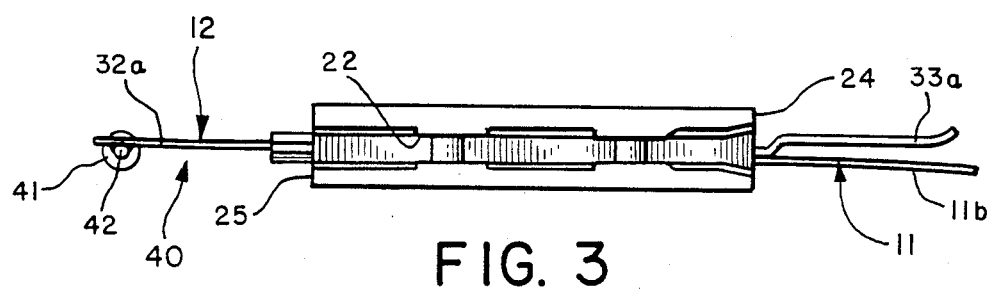
FIG. 3 is an end elevational view of the assembly illustrated in FIG. 1.

Referring now to the drawings, and particularly to FIGS. 1-3, a sensor assembly for sensing and controlling mass air flow to the intake manifold of a gasoline, internal combustion engine (not shown), is illustrated generally at 5. The sensor assembly 5 comprises a molded plastic body 10 in which a conventional Kapton sensing element 11 and a circuit strip complex 12 are encapsulated.

The molded plastic body 10 is formed of 40% glass-filled PPS plastic. This plastic is a dielectric material. The body 10 comprises a central panel 20 with a rectangular window 21 formed in it. At each end of the panel 20, an assembly mounting channel 22 opens outwardly, away from the central panel.

A portion 11a of the Kapton sensing element 11 is exposed, in the window 21, from both sides of the panel 20. Another portion 11b of the sensing element 11 protrudes from one side edge 25 of the body 10. The remainder of the sensing element (see FIG. 4) is encapsulated in the body 10 and, accordingly, is not visible in FIGS. 1-3.

The circuit strip complex 12 comprises three strip elements in the completed assembly 5, portions of which extend from the side edge 24 of the body 10 and portions of which extend from the opposite side edge 25. Two strip elements 31 and 32 extend entirely through the body so that the terminals 31a and 32a protrude from the body edge 24, while terminals 31b and 32b protrude from the edge 25. One strip element 33 protrudes only from the body edge 25, and includes two terminals 33a at that edge.

In the completed assembly 5, a compensator (resistor) element 40 is also welded between the ends of the terminals 31a and 32a. The element 40 includes a resistor 41 of conventional configuration and leads 42 which are welded at their free ends to respective terminals 31a and 32a.

Figure 4:
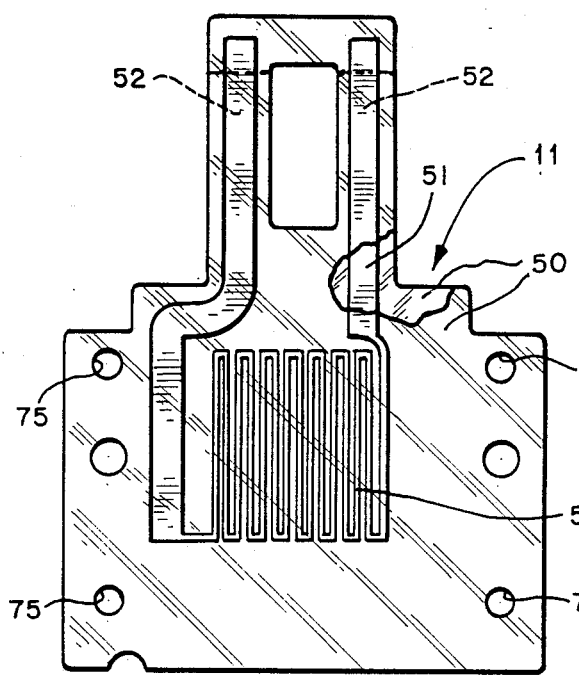
FIG. 4 is a plan view of a conventional Kapton which is incorporated in the assembly and used in the method embodying features of the invention.

Referring now to FIG. 4, one of the components of the assembly 5, the Kapton sensing element 11 is illustrated in free form. The sensing element 11 comprises two thin sheets of plastic film 50 which sandwich a nickel foil circuit 51 between them. The circuit 51 includes a serpentine section 51a which is positioned in approximately the center of the sensing element 11 and foil leads 52 which are exposed at their ends, on the underside of the sensing element, above the dotted lines which define the end of the bottom sheet of film 50.

Figure 5:
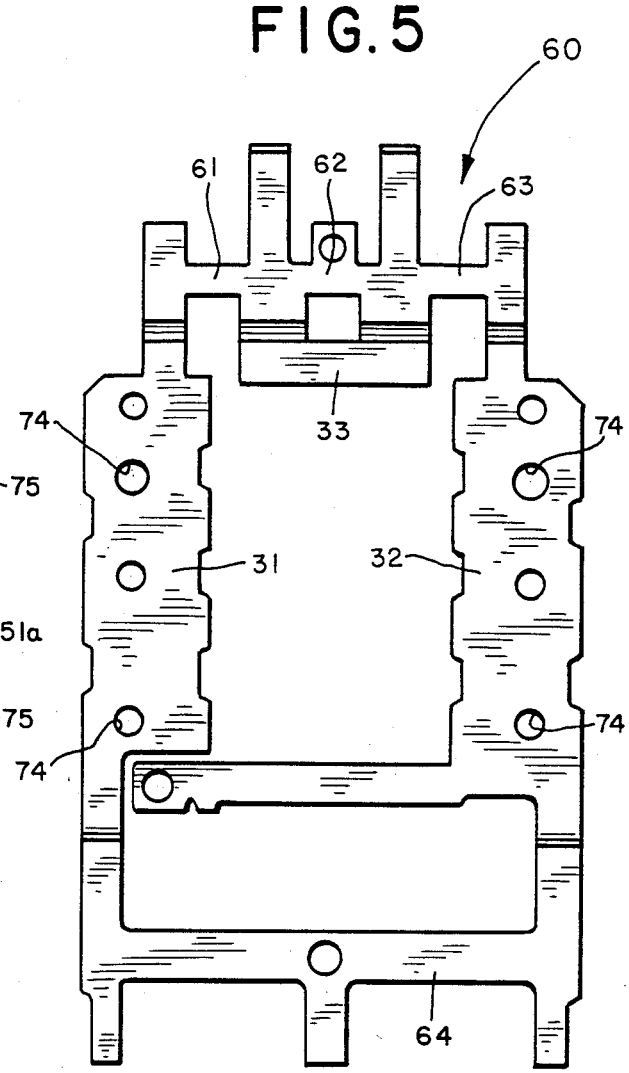
FIG. 5 is a plan view of circuit strip stamping employed in the method embodying features of the invention.

Another component of the sensing assembly 5, the circuit strip complex stamping 60, is illustrated in FIG. 5. The stamping 60, from which the circuit strip complex 12 is ultimately formed, includes bridge sections 61, 62, 63 and 64, which unify the strip elements 31, 32, and 33 in the stamping 60.

Figure 7:
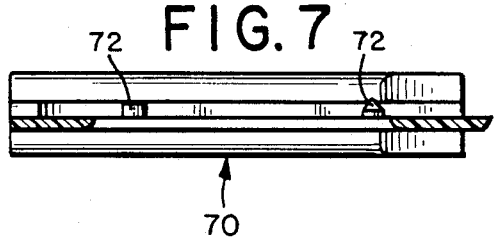
FIG. 7 is a sectional view taken along line 7—7 of FIG. 6.
Figure 6:
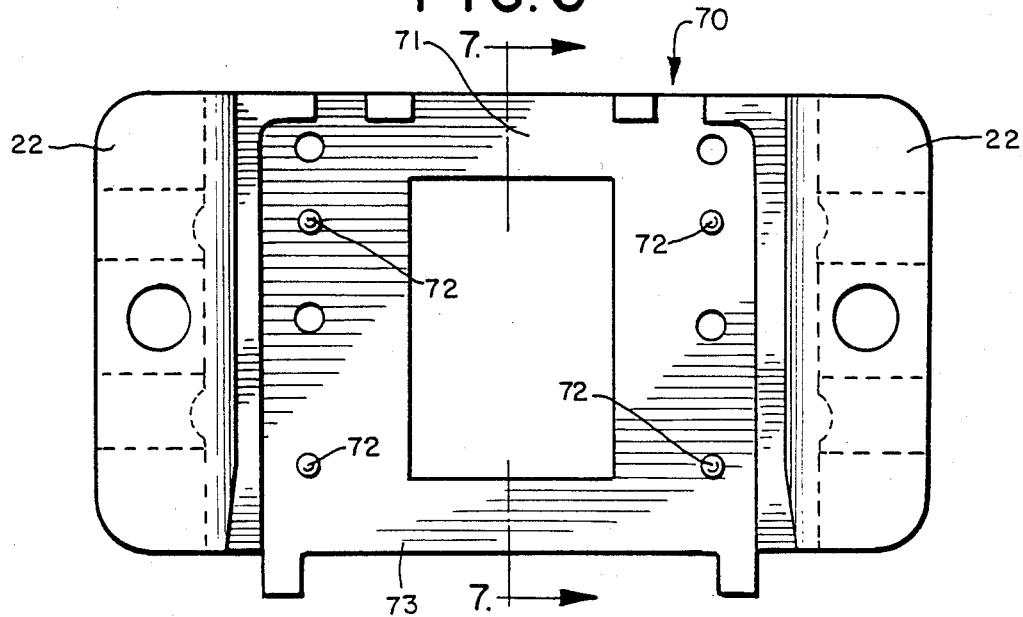
FIG. 6 is a plan view of a sensor body side panel employed in the method embodying features of the invention.

The other preformed component used in the fabrication of the assembly 5, according to the method of the present invention, is a pre-molded body part 70, which is best seen in FIGS. 6 and 7. The body part 70 actually comprises one section of the final molded plastic body 10. The part 70 includes one side panel 71 of the central panel 20. That one side panel 71 is bracketed by complete assembly mounting channels 22 (the channels seen in FIG. 2). Upwardly extending registry pins 72 are formed in plastic with the body part 70 in the one side panel 71 of the central panel 20.

The body part 70 is molded by a straight molding process in what amounts to the first step of the method embodying features of the invention. In that molding process a bed 73 for the sensing element 11 and the circuit strip complex stamping 60 is formed on the inside of the one side panel 71 in the part 70. The pins 72 extend upwardly from the bed 73.

According to the method of the invention, the sensing element 11 is pressed onto the registry pins 72 to seat on the bed 73 of the body part 70. As illustrated in FIG. 4, the element 11 has registry holes 75 in it which mate with the pins 72.

The stamping 60 is then pressed onto the pins 72 over the sensing element 11. It has registry holes 74 in it which mate with the pins 72, as seen in FIG. 5.

With the stamping 60 and sensing element 11 seated in this manner in the body part 70, this subassembly, seen in FIGS. 8 and 9, is seated in an injection mold die with the die cavity (not shown) over the bed 73 and the stamping 60. The molding operation injects molten plastic over the stamping 60 and the sensing element 11 to encapsulate them and form the complete panel 20. The die is configured so that the rectangular window 21 is left in the panel 20.

During this molding operation, the molten plastic effectively forms another side panel over the seated stamping 60 and sensing element 11. In doing so the registry pins 72 which have conical guide tips (see FIG. 9) have those tips flattened by the die cavity wall as they are softened by the heat of the molding process.

The final step in the method embodying features of the invention is to place the now unitary assembly in a punch and remove the connector bridges 61, 62, 63 and 64. At the same time, a compensator (resistor) 41 is welded to the two terminals 31a and 32a.

The sensor assembly 5 which is the finished product incorporates a sensing element 11 which is not prone to delamination. It is positioned under the circuit strips 31, 32, and 33, away from the bulk of the heat generated during molding. The newly molded side panel overlies the circuit strips, which separate it, to a great extent, from the Kapton 11.

While the preferred embodiment of the sensor assembly and method have been disclosed, it is understood that the invention is not limited to the disclosed examples. The scope of the invention is indicated in the appended claims, and all that come within the meaning and range of equivalency of the claims are intended to be embraced therein.

I claim:

1. A method of manufacturing a mass air flow sensor assembly, comprising the steps of:
    (a) straight molding one side panel of a sensor body;
    (b) providing a sensor element and a circuit strip blank and seating them, one on top of the other, on said one side panel; and
    (c) forming a second side panel of said sensor body over said sensor element and said circuit strip blank by injection molding dielectric material so as to encapsulate portions of said element and blank and bond itself to said one panel while leaving a window in said second side panel through which at least one of said sensor element and said circuit strip is exposed.

2. The method of claim 1 further characterized by and including the step of:
    (a) seating said sensor element on said one side panel and seating said circuit strip blank over said sensor element.

3. A method of manufacturing a mass air flow sensor assembly comprising the steps of:
    (a) straight molding one side panel of a sensor body so as to form a bed on said one side panel which has registry pins extending upwardly therefrom;
    (b) providing a sensor element and a circuit strip blank;
    (c) pressing said sensor element onto said bed over said registry pins to position it relative to said one side panel;
    (d) pressing said blank onto said sensor element over said registry pins; so that the tips of said pins extend through said blank;
    (e) seating said one side panel, said sensor element, and said blank in an injection molding die; and
    (f) forming a second side panel of said sensor body over said sensor element and circuit strip blank by injection molding dielectric material so as to encapsulate portions of said element and blank and bond itself to said one panel while leaving a window in said second side panel through which at least one of said sensor element and said circuit strip is exposed.

4. The method of claim 3 further characterized by and including the step of:
(a) severing and removing bridges from said circuit strip blank after the injection molding step to separate said blank into three terminal strips.

* * * * *

UNITED STATES PATENT AND TRADEMARK OFFICE
CERTIFICATE OF CORRECTION

PATENT NO. : 4,823,462
DATED : April 25, 1989
INVENTOR(S) : Duane J. Huber

It is certified that error appears in the above-identified patent and that said Letters Patent is hereby corrected as shown below:

On the title page Item [73] Assignee:
delete "Hilex Poly Company, Inc., Los Angeles, Calif." and substitute therefor --Capsonic Group, Inc., Elgin, Illinois--.

In column 2, line 50, please delete "elevationl" and substitute therefor --elevational--.

In claim 3, column 4, line 56, please delete "thereform" and substitute therefor --therefrom--.

Signed and Sealed this

Third Day of March, 1992

Attest:

HARRY F. MANBECK, JR.

*Attesting Officer*  *Commissioner of Patents and Trademarks*